R. DONALDSON.
APPARATUS FOR GRANULATING MOLTEN SLAG.
APPLICATION FILED MAR. 5, 1914.
1,117,644.
Patented Nov. 17, 1914.
2 SHEETS—SHEET 1.
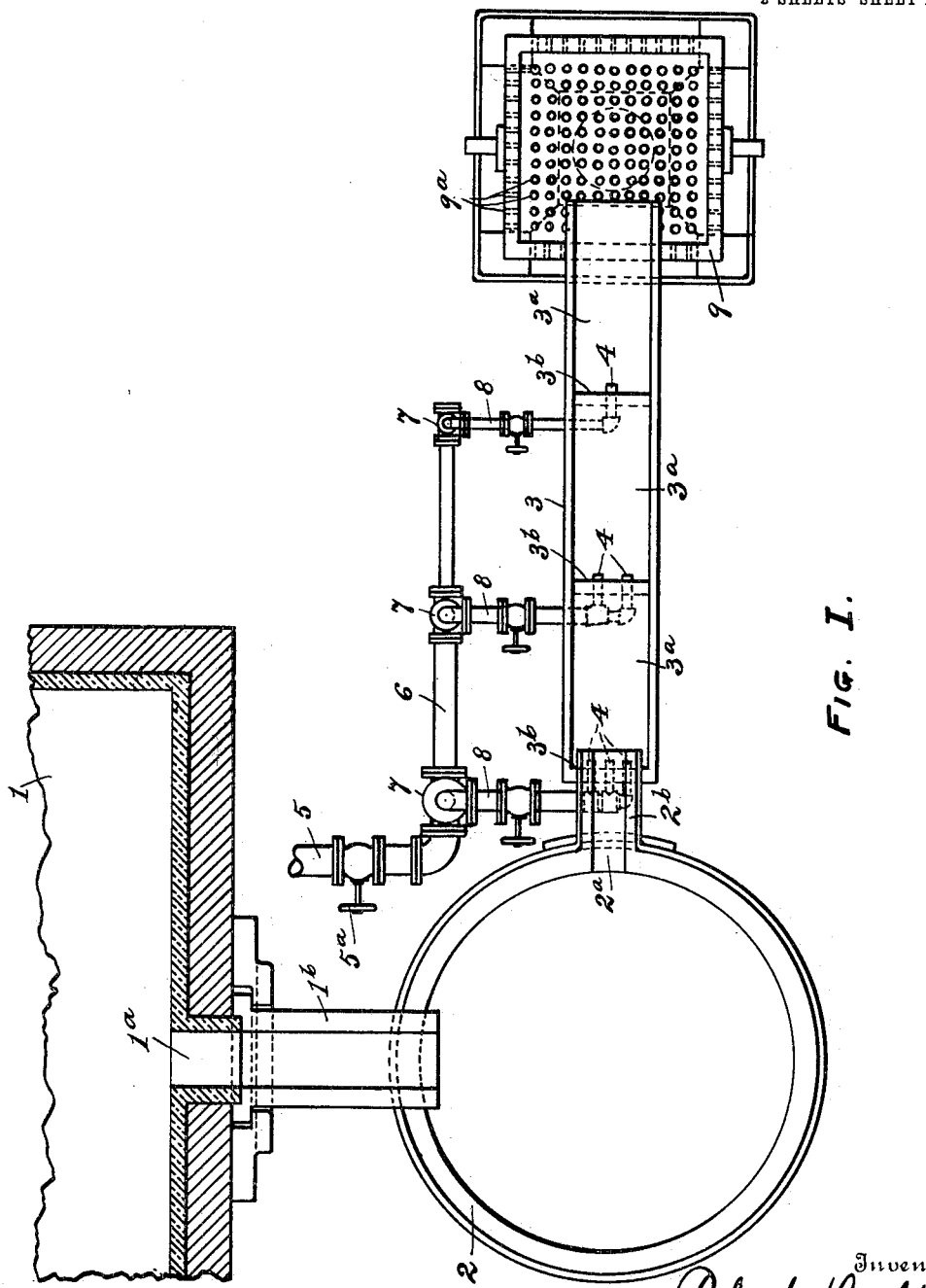
FIG. I.
Witnesses
F. C. Adams
N. H. Turrell
Inventor
Robert Donaldson
By Obed C. Billman, Attorney R. DONALDSON.
APPARATUS FOR GRANULATING MOLTEN SLAG.
APPLICATION FILED MAR. 5, 1914.
1,117,644.
Patented Nov. 17, 1914.
2 SHEETS—SHEET 2.
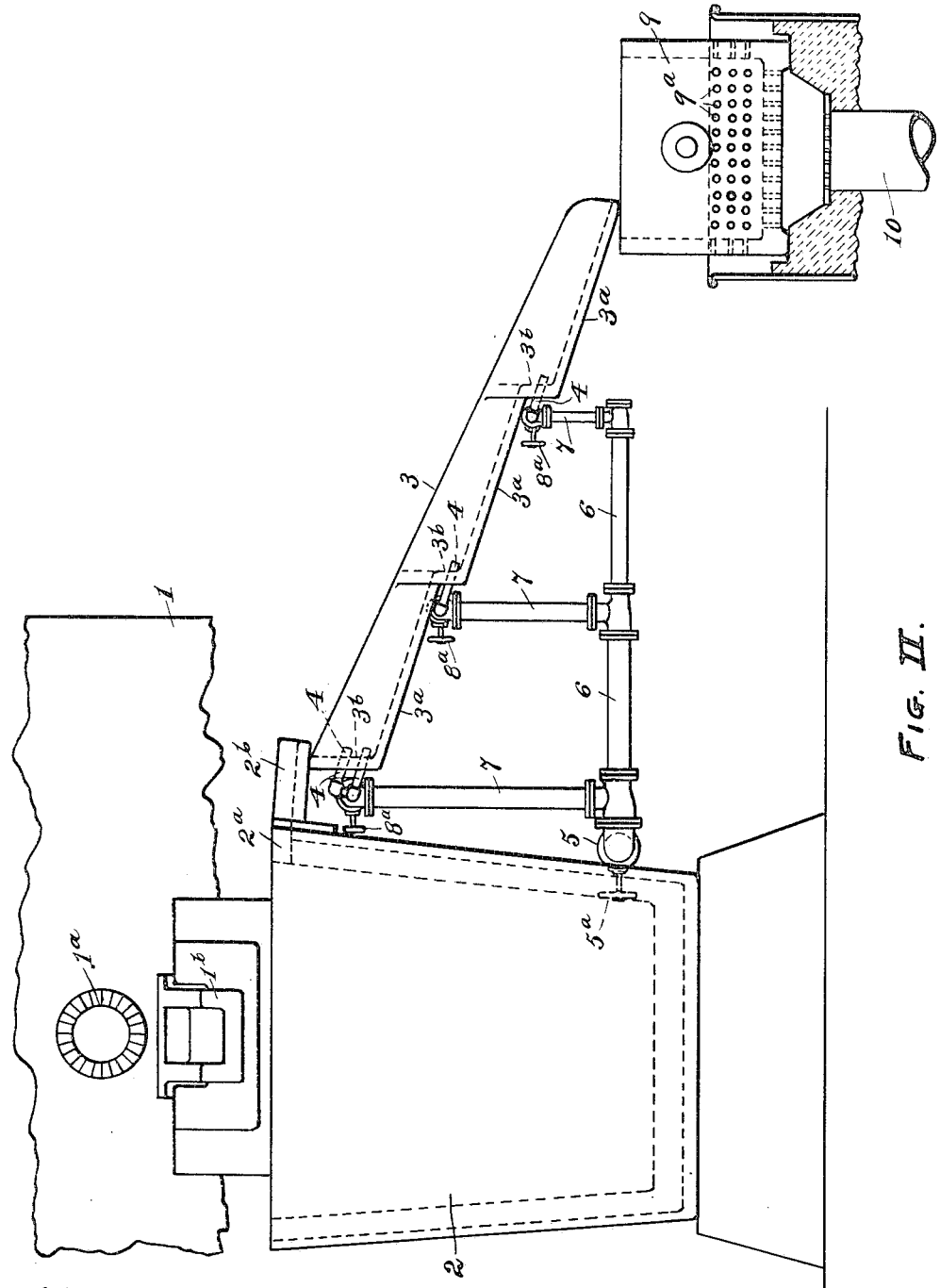
FIG. II.

UNITED STATES PATENT OFFICE.

ROBERT DONALDSON, OF CLEVELAND, OHIO.

APPARATUS FOR GRANULATING MOLTEN SLAG.

1,117,644.  Specification of Letters Patent.  Patented Nov. 17, 1914.

Application filed March 5, 1914. Serial No. 822,564.

*To all whom it may concern:*

Be it known that I, ROBERT DONALDSON, a citizen of the United States, residing at Cleveland, in the county of Cuyahoga and State of Ohio, have invented certain new and useful Improvements in Apparatus for Granulating Molten Slag, of which the following is a specification.

My invention relates to improvements in apparatus for treating or granulating molten slag, the present embodiment of the invention being particularly designed and adapted for granulating liquid blast-furnace slag.

The primary object of the invention is to provide a generally improved apparatus for the continuous treatment or reduction of such molten or liquid slag to a finely divided or granular condition whereby the same may be readily handled and utilized in the manufacture of the various slag products now on the market.

A further object is to provide an improved slag treating or reduction trough made up of a series or plurality of inclines arranged in stepped relation to each other, the offset or stepped portions thereof being intersected by suitable fluid discharge pipes or nozzles whereby the stream of molten or liquid slag is successively treated or subjected to the action of a suitable fluid under comparatively high pressure thereby not only thoroughly reducing or granulating the liquid slag but successively treating the same as it passes down the inclined slag treating or granulating trough.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a top plan view of an apparatus constructed in accordance with my invention. Fig. 2, a side elevation of the same.

Similar numerals of reference designate like parts throughout all the figures of the drawings.

The furnace 1, may be of any suitable and convenient form and is provided with a suitable slag outlet or orifice $1^a$, and may be provided with a suitable slag discharge spout $1^b$.

In the present instance, a pot or receptacle 2, is provided adapted to receive the molten or liquid slag from the discharge spout $1^b$, above and this pot or receptacle is provided with a slag notch $2^a$, and a slag spout $2^b$.

The improved slag treating or reduction trough 3, comprises a series or plurality of inclines $3^a$, forming the bottom thereof and arranged in stepped relation to each other, the base or offset portions $3^b$, being intersected by a plurality of fluid discharge pipes or nozzles 4.

The fluid for treating or breaking up and granulating the molten or liquid slag may be water, or other suitable treating fluid and is preferably discharged through the discharge pipes or nozzles 4, at a comparatively high pressure, and as shown in the drawing the pipes or nozzles 4, are preferably disposed just above and in substantially the same planes with the respective inclines $3^a$, so as to discharge the fluid at the rear of the falling stream of liquid slag whereby to carry the latter downwardly over the inclines $3^a$.

As a means for conducting and controlling the fluid to and through the discharge pipes or nozzles 4, a main conduit pipe 5, is provided, said main conduit being preferably provided with a valve $5^a$, and a distribution pipe 6. The distribution pipe 6, is provided, in the present instance, with vertically extending pipes 7, terminating in horizontally extending pipes 8, the latter being provided with valves $8^a$.

The horizontally extending or feed pipes 8, in the present instance, lead to and carry the fluid discharge pipes or nozzles 4, and the upper stepped or offset portions $3^b$, of the trough are preferably intersected by a plurality of pipes or nozzles 4, as shown, or as conditions may indicate or require.

The stream of granulated slag and treating fluid, such as water, or the like, issues from the lower end of the trough where it may be caught in a suitable receptacle, in the present instance, in the form of a perforated crane-ladle 9. As a means of permitting the treating fluid or water to speedily separate from and pass away from the granulated slag, the ladle 9, is preferably provided with suitable perforations or openings $9^a$, and the treating fluid may pass therefrom into a suitable discharge pipe 10.

By the provision of my improved slag treating or granulating trough made up of a series or plurality of inclines arranged in stepped relation to each other, and successively treating the stream of liquid or molten slag at the offset or stepped portions of the trough by means of fresh projecting streams of fluid issuing from the nozzles at comparatively high pressure and at the rear of and in substantially the same planes with the discharged stream of hot liquid slag, I am enabled to thoroughly disintegrate or reduce the slag to a finely divided or granular condition before it issues from the discharge end of the treating trough.

From the foregoing description, taken in connection with the accompanying drawings, the advantages and operation of my invention will be readily understood.

Having thus described one of the embodiments of my invention, without having attempted to set forth all the forms in which it may be made, or all the modes of its use, what I claim and desire to secure by Letters Patent, is,—

1. In an apparatus for treating liquid slag, a trough including a plurality of stepped inclines, and means for discharging treating streams of fluid over and above said inclines to disintegrate the slag material and accelerate the flow of the latter.

2. In an apparatus for treating liquid slag, a trough having a plurality of similarly stepped inclines, and means at the stepped portions for discharging streams of fluid over and in the direction of said inclines whereby to accelerate the flow of the slag material and disintegrate the same.

3. In an apparatus for treating liquid slag, a trough made up of a plurality of stepped inclines, and a plurality of fluid discharge pipes arranged at the stepped portions of said inclines and extending in the direction of the latter whereby to discharge successive accelerating streams of treating fluid into and in the general direction of the flow of the liquid slag over said stepped inclines.

4. An apparatus for treating liquid slag, comprising a liquid slag treating trough consisting of a plurality of inclines arranged in stepped relation, and a plurality of fluid discharge pipes intersecting and adapted to discharge successive treating and accelerating streams of fluid into and in the general direction of the flow of the liquid slag over and above said inclines.

5. In an apparatus for treating slag, a trough having a bottom made up of a plurality of similarly inclined members arranged in stepped relation to each other and extending in the same general direction, a plurality of fluid discharge pipes below said trough and intersecting the stepped portions thereof whereby to accelerate the flow of and disintegrate the slag material passing down said inclines, and valved conduit pipes leading to said fluid discharge pipes.

In testimony whereof I have affixed my signature in presence of two witnesses.

ROBERT DONALDSON.

Witnesses:
S. H. HARLEM,
JOHN S. DONALDSON.